(12) United States Patent
Nakazawa et al.

(10) Patent No.: US 11,186,722 B2
(45) Date of Patent: Nov. 30, 2021

(54) RESIN COATED INORGANIC OR METALLIC PIGMENT

(71) Applicant: DIC Corporation, Tokyo (JP)

(72) Inventors: Daisuke Nakazawa, Osaka (JP); Norio Kosaka, Osaka (JP); Kazuhiro Sugiyama, Sakura (JP); Takuya Otsubo, Sakura (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 16/322,979

(22) PCT Filed: Oct. 31, 2016

(86) PCT No.: PCT/JP2016/082258
§ 371 (c)(1),
(2) Date: Feb. 4, 2019

(87) PCT Pub. No.: WO2018/047359
PCT Pub. Date: Mar. 15, 2018

(65) Prior Publication Data
US 2019/0185676 A1    Jun. 20, 2019

(30) Foreign Application Priority Data
Sep. 6, 2016  (JP) .............................. JP2016-174100

(51) Int. Cl.
| C09C 1/64 | (2006.01) |
| C09C 3/10 | (2006.01) |
| C09C 1/62 | (2006.01) |
| C09D 143/02 | (2006.01) |
| C09C 1/66 | (2006.01) |
| C08K 5/315 | (2006.01) |
| C08L 33/08 | (2006.01) |
| C08L 33/10 | (2006.01) |

(52) U.S. Cl.
CPC ............... *C09C 1/644* (2013.01); *C09C 1/62* (2013.01); *C09C 1/625* (2013.01); *C09C 1/66* (2013.01); *C09D 143/02* (2013.01); *C01P 2004/54* (2013.01); *C01P 2004/61* (2013.01); *C01P 2004/62* (2013.01); *C08K 5/315* (2013.01); *C08L 33/08* (2013.01); *C08L 33/10* (2013.01); *C09C 3/10* (2013.01)

(58) Field of Classification Search
CPC ............... C09C 1/64; C09C 3/10; C09C 1/62
USPC ........................................................ 524/439
See application file for complete search history.

(56) References Cited

U.S. PATENT DOCUMENTS

| 4,750,940 | A  | 6/1988 | Higashi et al. |
| 2008/0249209 | A1 | 10/2008 | Trummer et al. |
| 2009/0117281 | A1 | 5/2009 | Sato et al. |
| 2012/0065298 | A1 | 3/2012 | Setoguchi |
| 2012/0165454 | A1 | 6/2012 | Yunazar et al. |
| 2013/0250002 | A1 | 9/2013 | Nishimura et al. |
| 2014/0079892 | A1 | 3/2014 | Yunazar et al. |
| 2014/0106161 | A1 | 4/2014 | Setoguchi |
| 2015/0166760 | A1 | 6/2015 | Trummer et al. |

FOREIGN PATENT DOCUMENTS

| CN | 1093155 | C |   | 10/2002 |
| CN | 101300310 | A |   | 11/2008 |
| CN | 102227253 | A |   | 10/2011 |
| CN | 102604445 | A |   | 7/2012 |
| JP | 62-253668 | A |   | 11/1987 |
| JP | 3056506 | B2 | * | 6/2000 |
| JP | 2002-226733 |   | * | 8/2002 |
| JP | 2002-226733 | A |   | 8/2002 |
| JP | 2004-231735 | A |   | 8/2004 |
| JP | 2005-146111 | A |   | 6/2005 |
| JP | 2008-201821 |   | * | 9/2008 |

(Continued)

OTHER PUBLICATIONS

International Search Report dated Dec. 27, 2016, issued for PCT/JP2016/082258 and English translation thereof.
Notice of Allowance dated Apr. 29, 2019, issued for the Korean patent application No. 10-2018-7037455 and English translation thereof.

(Continued)

*Primary Examiner* — Deve V Hall
(74) *Attorney, Agent, or Firm* — Locke Lord LLP; James E. Armstrong, IV; Nicholas J. DiCeglie, Jr.

(57) ABSTRACT

A resin coated inorganic or metallic pigment includes inorganic or metallic particles (A) and an acrylic copolymer (B) formed on the inorganic or metallic particles (A) by subjecting a radically polymerizable unsaturated carboxylic acid or radically polymerizable phosphate monomer (B1) and a monomer (B2) containing 3 to 6 (meth)acryloyloxy groups per molecule to radical polymerization reaction using a polymerization initiator (C) containing a nitrile group, wherein the inorganic or metallic particles (A) are coated with a coating resin including the acrylic copolymer (B), and the acrylic copolymer (B) has at a tail thereof a structure which is derived from the polymerization initiator (C) and which is represented by the following general formula (1):

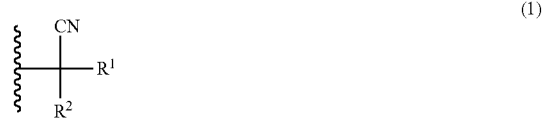

(1)

wherein $R^1$ represents a methyl group, and $R^2$ represents an alkyl group having 2 to 5 carbon atoms, or the like.

2 Claims, No Drawings

(56) References Cited

FOREIGN PATENT DOCUMENTS

| | | |
|---|---|---|
| JP | 2008-201821 A | 9/2008 |
| JP | 2009-503207 A | 1/2009 |
| JP | 2009-227710 A1 | 10/2009 |
| JP | 2009-227798 A | 10/2009 |
| JP | 2010-270281 A | 12/2010 |
| JP | 2014-185328 A | 10/2014 |
| KR | 10-2008-0056146 A | 6/2008 |
| KR | 10-2012-0035217 A | 4/2012 |
| WO | 96/38506 A1 | 12/1996 |
| WO | 97/027884 A1 | 8/1997 |
| WO | 2011/033655 A1 | 3/2011 |

OTHER PUBLICATIONS

Office Action issued in corresponding Chinese Patent Application No. CN201680087246.4, dated Jun. 24, 2020.

* cited by examiner

RESIN COATED INORGANIC OR METALLIC PIGMENT

TECHNICAL FIELD

The present invention relates to a resin coated inorganic or metallic pigment having a surface coated with a resin.

BACKGROUND ART

A metallic coating composition is used for coating automobile bodies and interior parts, household appliances, such as a refrigerator and a washing machine, mobile electronic devices, such as a smartphone and a mobile computer, and the like, and is widely used mainly for the purpose of imparting metallic texture to them. The metallic coating composition generally has incorporated thereinto a metallic pigment, such as a metal powder having a flattened shape (also called a flake shape or a plate shape), such as aluminum, copper, nickel, or titanium, or inorganic particles, such as mica.

Conventionally, in the metallic pigment, metal atoms or inorganic compound molecules are exposed on the surface, and react with an acid, an alkali, a chemical agent, or the like to cause smoothness of the pigment surface to deteriorate, so that the resultant metallic coating is poor in brightness. Further, such exposed metal atoms or inorganic compound molecules cause the coating film to suffer corrosion so that the surface of the substrate is exposed, causing the durability of the whole of the coated housing to be poor.

For solving these problems, attempts have been made to form a polymer film on the surface of a metallic pigment to impart to the pigment durability to an acid, an alkali, or a chemical agent.

For example, PTLs 1 and 2 report that, by coating the pigment surface with a copolymer which is obtained by polymerizing a monomer having three or more radically polymerizable double bonds and a radically polymerizable unsaturated carboxylic acid and/or a phosphate having a radically polymerizable double bond, an aluminum pigment having excellent water resistance, chemical resistance, and anti-fingerprint property can be obtained.

PTL 3 reports that, by coating the pigment surface with a copolymer which is obtained by polymerizing a monomer having three or more radically polymerizable double bonds, a monomer having one radically polymerizable double bond and one benzene ring, and (meth)acrylic acid, an aluminum pigment having excellent metallic luster, chemical resistance, and voltage endurance can be obtained.

PTL 4 reports that, by coating the pigment surface with a copolymer which is obtained by polymerizing a monomer having one or more radically polymerizable double bonds and a monomer having one or more radically polymerizable double bonds and a bridged cyclic structure having 9 to 12 carbon atoms, an aluminum pigment having excellent storage stability of the coating composition and moisture resistance can be obtained.

PTL 5 reports that, by mixing a molybdic acid amine salt and a metallic pigment with each other, and further coating the pigment surface with a copolymer which is obtained by polymerizing a radically polymerizable unsaturated carboxylic acid, a phosphate or phosphonate having a radically polymerizable double bond, a coupling agent having a radically polymerizable double bond, and a monomer having two or more radically polymerizable double bonds, an aluminum pigment having excellent storage stability of the coating composition, metallic luster, adhesion properties, and chemical resistance can be obtained.

Further, PTL 6 reports that, by coating the pigment surface with a copolymer which is obtained by polymerizing an inorganic network having a silicon component selected from the group consisting of a silicon oxide, a silicon suboxide, a silicon oxide hydrate, a silicon hydroxide, and a mixture thereof, and a monomer which is functional and selected from the group consisting of epoxy, acrylate, methacrylate, vinyl, and a mixture thereof, and which is at least partially covalently bonded to the inorganic network, an aluminum pigment having excellent mechanical stability and low gas-generation properties can be obtained.

CITATION LIST

Patent Literature

PTL 1: JP-A-62-253668
PTL 2: JP-A-2014-185328
PTL 3: JP-A-2005-146111
PTL 4: JP-A-2010-270281
PTL 5: JP-A-2008-201821
PTL 6: JP-T-2009-503207 (the term "JP-T" as used herein means a published Japanese translation of a PCT patent application)

SUMMARY OF INVENTION

Technical Problem

In the above-mentioned techniques, however, the polymer film coating the surface of the metallic pigment does not have a uniform thickness, and thus causes the brightness required for the metallic coating to be poor. Further, an uncoated portion (pinhole) is likely to be present on the surface of the metallic pigment, so that the chemical resistance becomes poor, adversely affecting the durability of the coating film.

In view of the above-mentioned technical background, a task to be achieved by the present invention is to provide a pigment having excellent brightness and excellent resistance to chemicals, such as an alkali.

Solution to Problem

The present inventors have conducted extensive and intensive studies with a view toward solving the above-mentioned problems. As a result, it has been found that, by using a specific polymerization initiator in the polymerization of an acrylic copolymer for coating the surface of inorganic or metallic particles, a pigment having excellent brightness and excellent chemical resistance can be obtained, and the present invention has been completed.

Specifically, according to the present invention, there is provided a resin coated inorganic or metallic pigment including: inorganic or metallic particles (A); and an acrylic copolymer (B) formed by subjecting a radically polymerizable unsaturated carboxylic acid or radically polymerizable phosphate monomer (B1) and a monomer (B2) containing 3 to 6 (meth)acryloyloxy groups per molecule to radical polymerization reaction using a polymerization initiator (C) containing a nitrile group, wherein the inorganic or metallic particles (A) are coated with a coating resin including the copolymer (B), and the acrylic copolymer (B) has at a tail thereof a structure which is derived from the polymerization initiator (C) and which is represented by the following general formula (1):

[Chem. 1]

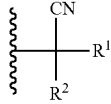

(1)

wherein $R^1$ represents a methyl group, and $R^2$ represents an alkyl group having 2 to 5 carbon atoms, a group represented by —C(=O)OR$^{2a}$, or a group represented by —C(=O)NHR$^2$a (wherein the Rea represents an alkyl group having 1 to 8 carbon atoms), and the $R^1$ and the $R^2$ are optionally bonded to each other to form a cyclic structure.

Advantageous Effects of Invention

The resin coated inorganic or metallic pigment of the invention is obtained by subjecting a radically polymerizable unsaturated carboxylic acid or radically polymerizable phosphate monomer (B1) and a monomer (B2) containing 3 to 6 (meth)acryloyloxy groups per molecule to radical polymerization reaction using a polymerization initiator (C) containing a nitrile group, and therefore has a coating resin which is smooth and which has a uniform thickness, and thus has excellent brightness and excellent resistance to chemicals, such as an alkali.

DESCRIPTION OF EMBODIMENTS

<<Resin Coated Inorganic or Metallic Pigment>>

The resin coated inorganic or metallic pigment according to the present embodiment (frequently referred to simply as "coated pigment") includes inorganic or metallic particles (A) and an acrylic copolymer (B) formed by subjecting a radically polymerizable unsaturated carboxylic acid or radically polymerizable phosphate monomer (B1) and a monomer (B2) containing 3 to 6 (meth)acryloyloxy groups per molecule to radical polymerization reaction using a polymerization initiator (C) containing a nitrile group, wherein the inorganic or metallic particles (A) are coated with a coating resin including the copolymer (B), and the acrylic copolymer (B) has at a tail thereof a structure which is derived from the polymerization initiator (C) and which is represented by the following general formula (1):

[Chem. 2]

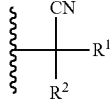

(1)

wherein $R^1$ represents a methyl group, and $R^2$ represents an alkyl group having 2 to 5 carbon atoms, a group represented by —C(=O) OR$^{2a}$, or a group represented by —C(=O)NHR$^{2a}$ (wherein the R$^{2a}$ represents an alkyl group having 1 to 8 carbon atoms), and the $R^1$ and the $R^2$ are optionally bonded to each other to form a cyclic structure.

<Particles (A)>

The inorganic or metallic particles (A) in the embodiment (frequently referred to simply as "particles (A)") are inorganic particles or metallic particles, and include arbitrary particles containing an inorganic material or a metal. Examples of metals include elements belonging to Groups 1 to 15 of the Periodic Table, excluding those in the first and second periods. Examples of inorganic and/or metal materials include mica titanium, a glass powder, an aluminum powder, a silver powder, a copper powder, a bronze powder, a zinc powder, a stainless steel powder, and a nickel powder. Of these, a metal powder is preferred, metallic particles in a flattened shape (flake shape) are more preferred, aluminum particles are further preferred, and, from the viewpoint of brightness, aluminum particles in a flattened shape are especially preferred.

With respect to the inorganic or metallic particles (A) in the embodiment, those which are produced by a conventionally known method can be widely used. When the particles (A) in a flattened shape are used, the particles may be obtained by grinding or processing substantially spherical particles into particles in a flattened shape, or particles which are originally synthesized or processed in a flattened shape may be used. As examples of processing methods for aluminum particles in a flattened shape, there can be mentioned a method using a ball mill and a method utilizing vapor deposition. Examples of particles include aluminum particles having a shape called cornflake or silver dollar and vacuum metalized pigment (VMP).

The shape of the particles (A) is described below. Generally, it is not expected that only a single particle (A) is provided as a pigment, and therefore the value shown below may be an average determined with respect to a plurality of particles (A) provided.

The average particle diameter of the particles (A) may be 100 μm or less, may be 0.1 to 100 μm, may be 1 to 80 μm, and may be 5 to 50 μm.

The average particle diameter of the particles (A) can be determined as a volume-based median diameter d50 by making a calculation from a volume-based cumulative particle size distribution measured by means of a laser diffraction-type particle size distribution measurement apparatus.

From the viewpoint of obtaining excellent brightness and dispersibility, the average particle diameter of the particles (A) is preferably 0.1 μm or more. Especially, from the viewpoint of obtaining particularly excellent brightness and dispersibility, the average particle diameter of the particles (A) is preferably 5 μm or more. When the average particle diameter of the particles (A) is 100 μm or less, an advantage is achieved in that the particles are unlikely to precipitate and excellent brightness is obtained. Especially when the average particle diameter of the particles (A) is 50 μm or less, an advantage is achieved in that the particles are unlikely to precipitate and excellent brightness is obtained.

When the particles (A) are in a flattened shape, the average thickness of the particles (A) may be 1 μm or less, may be 0.001 to 1 μm, may be 0.01 to 0.8 μm, and may be 0.01 to 0.5 μm. The average thickness of the particles (A) is determined by a method in which an average of the thickness of each of the particles (A) at randomly selected regions is determined and, from the obtained values, an average of the thickness with respect to a plurality of particles (A) is determined. The expression "a plurality of particles" means 10 or more particles.

The ratio R/t of the average particle diameter (R) to the average thickness (t) of the particles (A) is preferably 5 or more, and may be 5 to 3,000, may be 15 to 1,500, and may be 30 to 750. When the ratio R/t of the particles (A) is in the above range, the particles are in an appropriate flake shape, so that excellent brightness is easily obtained.

The particles (A) preferably have a surface roughness Ra of 20 nm or less, more preferably 15 nm or less. The particles (A) preferably have a surface roughness Rc of 80 nm or less, more preferably 60 nm or less. When the surface roughness Ra and/or Rc is the above upper limit or less, the surface state of the particles (A) becomes more smooth, so that excellent brightness is easily exhibited.

With respect to the shape of the particles (A), it is preferred that, among the ranges of the values of the above-mentioned five items, i.e., average particle diameter, average thickness, R/t, Ra, and Rc, the ranges of the values of two or more items are satisfied.

<Acrylic Copolymer (B)>

The acrylic copolymer (B) in the embodiment is a radical polymerization product of a radically polymerizable unsaturated carboxylic acid or radically polymerizable phosphate monomer (B1) (frequently referred to simply as "monomer (B1)") and a monomer (B2) containing 3 to 6 (meth) acryloyloxy groups per molecule (frequently referred to simply as "monomer (B2)"). The acrylic copolymer (B) in the embodiment contains a structural unit derived from the monomer (B1) and a structural unit derived from the monomer (B2).

The monomer (B1) in the embodiment is a radically polymerizable unsaturated carboxylic acid or a radically polymerizable phosphate.

Examples of radically polymerizable unsaturated carboxylic acids include unsaturated monocarboxylic acids, such as acrylic acid, methacrylic acid, and crotonic acid, unsaturated dicarboxylic acids, such as maleic acid, fumaric acid, and itaconic acid, and half esters of the above unsaturated dicarboxylic acids. These monomers can be used individually or in combination.

Examples of radically polymerizable phosphates include 2-methacryloyloxyethyl phosphate, di-2-methacryloyloxyethyl phosphate, tri-2-methacryloyloxyethyl phosphate, 2-acryloyloxyethyl phosphate, di-2-acryloyloxyethyl phosphate, tri-2-acryloyloxyethyl phosphate, bis(2-hydroxyethyl methacrylate) phosphate, diphenyl-2-methacryloyloxyethyl phosphate, diphenyl-2-acryloyloxyethyl phosphate, dibutyl-2-methacryloyloxyethyl phosphate, dioctyl-2-acryloyloxyethyl phosphate, and 2-methacryloyloxypropyl phosphate. These monomers can be used individually or in combination.

The monomer (B2) in the embodiment is a monomer containing 3 to 6 (meth)acryloyloxy groups per molecule.

Examples of monomers containing 3 to 6 (meth)acryloyloxy groups per molecule include trimethylolpropane triacrylate, trimethylolpropane trimethacrylate, glycerol triacrylate, ditrimethylolpropane tetramethacrylate, ditrimethylolpropane tetraacrylate, pentaerythritol triacrylate, pentaerythritol tetraacrylate, dipentaerythritol pentaacrylate, dipentaerythritol hexaacrylate, an ethylene oxide (EO) and/or propylene oxide (PO) addition product of the above monomer, and isocyanuric acid EO-modified triacrylate. These monomers can be used individually or in combination.

From the viewpoint of achieving excellent coating state of the coating resin, the molar ratio (B1:B2) of the structural unit derived from the monomer (B1) and the structural unit derived from the monomer (B2) of the acrylic copolymer (B) in the coated pigment is preferably 1:1.5 to 1:10, more preferably 1:1.5 to 1:8, further preferably 1:1.5 to 1:7.

<Polymerization Initiator (C)>

The polymerization initiator (C) in the embodiment is a radical polymerization initiator which generates at least radicals as an active species, and which contains a nitrile group. As the polymerization initiator (C), preferred is an azo polymerization initiator containing a nitrile group.

When the monomer (B1) and the monomer (B2) are subjected to radical polymerization reaction using the polymerization initiator (C) in the embodiment, the resultant acrylic copolymer (B) has at a tail thereof a structure which is derived from the polymerization initiator (C) and which is represented by the following general formula (1):

[Chem. 3]

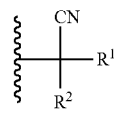

(1)

wherein $R^1$ represents a methyl group, and $R^2$ represents an alkyl group having 2 to 5 carbon atoms, a group represented by $-C(=O)OR^{2a}$, or a group represented by $-C(=O)NHR^{2a}$ (wherein the $R^{2a}$ represents an alkyl group having 1 to 8 carbon atoms), and the $R^1$ and the $R^2$ are optionally bonded to each other to form a cyclic structure.

The alkyl group having 2 to 5 carbon atoms for $R^2$ may be of a linear chain or a branched chain. Examples of alkyl groups having 2 to 5 carbon atoms include an ethyl group, a propyl group, an isopropyl group, a n-butyl group, an isobutyl group, a tert-butyl group, a pentyl group, an isopentyl group, and a neopentyl group.

The alkyl group having 1 to 8 carbon atoms for Rea may be of a linear chain or a branched chain. Examples of alkyl groups having 1 to 8 carbon atoms include an ethyl group, a propyl group, an isopropyl group, a n-butyl group, an isobutyl group, a sec-butyl group, a tert-butyl group, a pentyl group, an isopentyl group, a neopentyl group, a hexyl group, a heptyl group, and an octyl group.

In the formula (1) above, it is preferred that $R^1$ represents a methyl group, and $R^2$ represents a linear alkyl group having 2 to 5 carbon atoms.

In the formula (1) above, it is preferred that $R^1$ represents a methyl group, and $R^2$ represents an alkyl group having 2 to 3 carbon atoms.

In the formula (1) above, it is preferred that $R^1$ represents a methyl group, and $R^2$ represents a linear alkyl group having 2 to 3 carbon atoms.

As the polymerization initiator (C) in the embodiment, there can be mentioned a compound represented by the following general formula (2):

[Chem. 4]

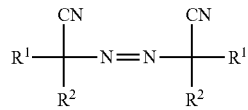

(2)

wherein $R^1$ and $R^2$ have the same meanings as those in the formula (1) above.

As examples of the polymerization initiators (C) in the embodiment, there can be mentioned 2,2'-azobis(2-methylbutyronitrile), 2,2'-azobis(2,4-dimethylvaleronitrile), and 1,1'-azobis(cyclohexane-1-carbonitrile), and 2,2'-azobis(2-methylbutyronitrile) is preferred.

The half-life time of the polymerization initiator (C) in the embodiment at a polymerization temperature of 90 to 100° C. is preferably 3 to 45 minutes, preferably 4 to 40 minutes, more preferably 5 to 35 minutes, further preferably 5 to 20 minutes, especially preferably 5 to 10 minutes.

The half-life time of the polymerization initiator (C) in the embodiment at a polymerization temperature of 90 to 100° C. may be 5 to 15 minutes, may be 15 to 25 minutes, and may be 25 to 35 minutes.

<Particles (A) and Coating Resin>

Hereinbelow, the particles (A) and coating resin in the coated pigment of the embodiment will be described. Generally, it is not expected that only a single particle of pigment is provided as the coated pigment, and therefore the value shown below may be an average determined with respect to the coated pigment provided.

In the coated pigment of the embodiment, the particles (A) are coated with a coating resin containing the acrylic copolymer (B).

The coating resin preferably contains the acrylic copolymer (B) in an amount of 50% by mass or more, more preferably 80% by mass or more, further preferably 95% by mass or more, especially preferably 99% by mass or more. The coating resin may be comprised only of the acrylic copolymer (B).

In the present specification, the expression that the particles (A) are "coated with a coating resin" means a state such that a coating resin is stacked on a part of or all of the surface of the particles (A). The coating resin is preferably directly bonded to the surface of the particles (A). Examples of types of bonding include chemical bonding, such as covalent bonding, coordinate bonding, and ionic bonding. When the coating resin is bonded to the surface of the particles (A), the coating resin can be unlikely to be peeled off the particles (A).

In the coated pigment of the embodiment, the mass ratio of the particles (A) and the coating resin (particles (A): coating resin) is preferably 50:50 to 99.9:0.1, especially preferably 70:30 to 99.7:0.3. When the mass ratio of the particles (A) and the coating resin is in the above range, an advantageous balance between the brightness of the particles (A) and the chemical resistance of the coating resin is obtained. Further, the coating of the resin on the particles (A) advantageously becomes thinner in view of the brightness.

In applications in which the chemical resistance is particularly important, such as the precoated metal application, the thickness of the coating resin is preferably larger as long as excellent balance between the brightness and the chemical resistance can be obtained, and the [particles (A):coating resin] mass ratio is especially preferably 70:30 to 90:10.

Further, in applications in which the brightness is particularly important, for utilizing as much the light reflecting properties of the aluminum pigment per se as possible, the thickness of the coating resin is preferably smaller as long as excellent balance between the brightness and the chemical resistance can be obtained, and the [particles (A):coating resin] mass ratio is preferably 80:20 to 99:1, especially preferably 80:20 to 95:5.

In the coated pigment of the embodiment, the mass [g] of the monomer (B1) relative to the total surface area [$m^2$] of the particles (A) (mass [g] of the monomer (B1)/total surface area [$m^2$] of the particles (A)) is preferably $5\times10^{-4}$ to $35\times10^{-4}$ [$g/m^2$], more preferably $7\times10^{-4}$ to $25\times10^{-4}$ [$g/m^2$], further preferably $10\times10^{-4}$ to $20\times10^{-4}$ [$g/m^2$].

When the mass of the monomer (B1) relative to the total surface area of the particles (A) is in the above range, an advantageous balance between the brightness of the particles (A) and the chemical resistance of the coating resin is obtained. Further, the monomer (B1) can be a starting point of the polymerization for the acrylic copolymer (B). Therefore, it is considered that, when the mass of the monomer (B1) relative to the total surface area of the particles (A) is $6\times10^{-4}$ or more, radical polymerization on the surface of the particles (A) proceeds in a more uniform state between the regions. As a result, a coating resin which is smooth and which has a uniform thickness can be obtained.

The total surface area of the particles (A) can be calculated from the specific surface area of the particles (A) measured using a specific surface area meter and the mass of the particles (A).

The coating resin may have resin particles. The resin particles in the embodiment can be formed from the copolymer (B) which has suffered radical polymerization on the particles (A), and can be a hemispherical copolymer.

With respect to the index of the degree of the "smoothness" and "uniform thickness" of the coating resin, in the coated pigment of the embodiment, the proportion of the total area of the resin particles having an area circle-equivalent diameter of 25 nm or more on the surface of the coating resin to the area of the coating resin is preferably 15 area % or less, more preferably 13 area % or less, further preferably 5 area % or less, especially preferably 2 area % or less. In the coated pigment in which the proportion of the total area of the resin particles having an area circle-equivalent diameter of 25 nm or more is the above-mentioned upper limit or less, the coating resin is smooth and has a uniform thickness, and therefore the coated pigment has very excellent brightness and chemical resistance.

The proportion of the total area (projected area) of the resin particles having an area circle-equivalent diameter of 25 nm or more on the surface of the coating resin to the area (projected area) of the coating resin is determined as follows. For example, using a SEM image file of the coated pigment, a Heywood diameter (area circle-equivalent diameter) of each of the resin particles observed in the measuring region is determined by calculation, and, with respect to the observed resin deposited on the surface of the resin coated aluminum pigment, a proportion (area %) of the resin particles having an area circle-equivalent diameter of 25 nm or more can be calculated from the following formula.

Proportion of the resin particles having an area circle-equivalent diameter of 25 nm or more (area %)

=Total area ($\mu m^2$) of the resin particles having an area circle-equivalent diameter of 25 nm or more in the measuring region/Area of the measuring region ($\mu m^2$)×100

With respect to the image used in the measurement, only the portion having the image of the coating resin is used as a measuring region, and the total area of the resin particles having an area circle-equivalent diameter of 25 nm or more is determined by calculation from the individual area circle-equivalent diameters. The value may be determined as an average of the results of the observation made with respect to the particle surface of a plurality of coated particles.

The coated pigment of the embodiment can be produced by, as an example, the below-mentioned method for producing a coated pigment.

The coated pigment of the embodiment may be obtained by:

(i) subjecting particles (A) and a monomer (B1) to reaction, and (ii) subjecting the monomer (B1) or a structure derived therefrom and a monomer (B2) to radical polymerization reaction using a polymerization initiator (C) to form an acrylic copolymer (B) on the particles (A), wherein the inorganic or metallic particles (A) are coated with a coating resin including the acrylic copolymer (B), wherein the acrylic copolymer (B) has at a tail thereof a structure which is derived from the polymerization initiator (C) and which is represented by the following general formula (1):

[Chem. 5]

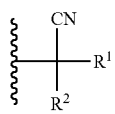
(1)

wherein $R^1$ represents a methyl group, and $R^2$ represents an alkyl group having 2 to 5 carbon atoms, a group represented by $-C(=O)-O-R^{2a}$, or a group represented by $-C(=O)-NH-R^{2a}$ (wherein the $R^{2a}$ represents an alkyl group having 1 to 8 carbon atoms), and the $R^1$ and the $R^2$ are optionally bonded to each other to form a cyclic structure.

The radical polymerization reaction is preferably conducted under conditions such that the half-life time of the initiator is 3 to 45 minutes, preferably conducted under conditions such that the half-life time of the initiator is 4 to 40 minutes, more preferably conducted under conditions such that the half-life time of the initiator is 5 to 35 minutes, further preferably conducted under conditions such that the half-life time of the initiator is 5 to 20 minutes, especially preferably conducted under conditions such that the half-life time of the initiator is 5 to 10 minutes.

The radical polymerization reaction may be conducted under conditions such that the half-life time of the initiator is 5 to 15 minutes, may be conducted under conditions such that the half-life time of the initiator is 15 to 25 minutes, and may be conducted under conditions such that the half-life time of the initiator is 25 to 35 minutes.

<Coating Composition and Ink>

The coated pigment of the embodiment can be used as a coating composition or an ink. As one embodiment, a coating composition or ink containing the coated pigment of the embodiment can be provided. Examples of coating compositions include a powder coating composition, a coating composition for furniture coating, a coating composition for appliance coating, a coating composition for automobile coating, and a coating composition for plastic coating. Examples of inks include an ink for printing and an ink for packaging material printing.

The coating composition or ink may contain the coated pigment of the embodiment, a dispersing medium, and a resin for coating composition or ink. As the dispersing medium, an arbitrary dispersing medium for use in dispersing a metallic pigment can be used, and a conventionally known dispersing medium may be used. Examples of dispersing media include alcohol solvents, such as ethyl alcohol, n-propyl alcohol, isopropyl alcohol, n-butyl alcohol, and isobutyl alcohol; ester solvents, such as ethyl acetate, propyl acetate, and butyl acetate; ketone solvents, such as methyl ethyl ketone, methyl butyl ketone, and cyclohexanone; ether ester solvents, such as methyl cellosolve acetate and butyl cellosolve acetate; amide solvents, such as dimethylformamide and dimethylacetamide; aromatic hydrocarbon solvents, such as toluene and xylene; aliphatic hydrocarbon solvents, such as hexane, heptane, and white spirit; and mixed solvents of an aromatic hydrocarbon and an aliphatic hydrocarbon, such as mineral spirit.

As the resin for the coating composition or ink, there can be used an arbitrary resin generally incorporated into a coating composition or ink, and a conventionally known resin may be used. Examples of resins include an acrylic resin, a polyester resin, an alkyd resin, a urethane resin, an epoxy resin, a vinyl chloride-vinyl acetate copolymer resin, a polyamide resin, and a melamine resin.

Further, as the pigment for the coating composition or ink, in addition to the coated pigment of the embodiment, the coating composition or ink can further contain an arbitrary coloring pigment which is other than the coated pigment of the embodiment and which is generally incorporated into a coating composition or ink, and a conventionally known coloring pigment may be used. Examples of coloring pigments include a phthalocyanine pigment, a halogenated phthalocyanine pigment, a quinacridone pigment, a diketopyrrolopyrrole pigment, an isoindolinone pigment, an azo pigment, an azo methine metal complex pigment, an indanthron pigment, a perylene pigment, a perinone pigment, an anthraquinone pigment, a dioxazine pigment, a benzimidazolone pigment, a condensed azo pigment, a triphenylmethane pigment, a quinophthalone pigment, an anthrapyrimidine pigment, titanium oxide, iron oxide, carbon black, and bismuth vanadate.

For example, the coating composition or ink preferably contains the coated pigment in an amount of 0.5 to 50% by mass, more preferably 5 to 40% by mass, further preferably 10 to 30% by mass.

The coating composition or ink may contain, in addition to the coated pigment of the embodiment, if necessary, various additives, such as an age resistor, an antiseptic agent, an anti-softening agent, an ultraviolet light absorber, an antioxidant, a light stabilizer, a heat stabilizer, and an antistatic agent.

The coated pigment of the embodiment is coated with a coating resin containing the acrylic copolymer (B) formed by radical polymerization reaction using the polymerization initiator (C). When the monomer (B1) and the monomer (B2) are subjected to radical polymerization reaction using the polymerization initiator (C) in the embodiment, the coating resin containing the resultant acrylic copolymer (B) is smooth and has a uniform thickness, so that the obtained coated pigment has excellent brightness and excellent chemical resistance. The reason for this is presumed that the half-life time of the polymerization initiator (C) at a polymerization temperature is relatively short, and therefore the amount of the radicals supplied per unit time is increased, and hence the size of the formed resin particles is reduced and the number of the formed resin particles is increased to cause the radical polymerization reaction to proceed in a more uniform state between the regions, so that a coating resin which is smooth and which has a uniform thickness is formed.

By using the polymerization initiator (C), the obtained acrylic copolymer (B) has a small molecular weight, as compared to that obtained by the prior art, so that the size of the resin particles growing on the resin surface is small, as compared to that in the prior art. Consequently, the area of voids caused between the formed resin particles which are a hemispherical copolymer can be such small that it is negligible. This means that the coated pigment has almost no exposed area of the inorganic or metallic particles, and thus the coated pigment is unlikely to suffer corrosion due to an acid or an alkali, and can surely achieve excellent chemical resistance.

Further, the resin particles having a smaller diameter reduce unevenness of the surface of the resin coated pigment, and hence are unlikely to cause irregular reflection of a light, making it possible to prevent a lowering of the brightness.

When the thickness of the layer of the coating resin is increased, it is possible to improve the chemical resistance. However, the layer of the coating resin having an increased thickness lowers the brightness. Meanwhile, in the coated pigment of the embodiment, the coating resin is smooth and has a uniform thickness, and therefore the brightness and chemical resistance are very excellent.

When the surface of the resin is not smooth, such a surface causes the resin to be easily peeled off due to force applied to the protruding portion of the surface. Meanwhile, in the coated pigment of the embodiment, the coating resin is smooth and has a uniform thickness, and therefore the coating film durability as well as brightness and chemical resistance can be excellent.

In the coated pigment having a coating resin which is smooth and which has a uniform thickness, the thickness of the coating resin can be reduced, as compared to that in a coated pigment having an equivalent chemical resistance, so that inherent brightness of the particles (A) is more advantageously exhibited.

<<Method for Producing the Coated Pigment>>

A method for producing the coated pigment of the embodiment has:

(i) the step of subjecting particles (A) and a monomer (B1) to reaction, and (ii) the step of subjecting the monomer (B1) or a structure derived therefrom and a monomer (B2) to radical polymerization reaction using a polymerization initiator (C) to form an acrylic copolymer (B) on the particles (A), wherein the particles (A) are coated with a coating resin containing the acrylic copolymer (B), wherein the radical polymerization reaction is conducted under conditions such that the half-life time of the initiator is 3 to 45 minutes, wherein the acrylic copolymer (B) has at a tail thereof a structure which is derived from the polymerization initiator (C) and which is represented by the following general formula (1):

[Chem. 6]

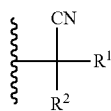

(1)

wherein $R^1$ represents a methyl group, and $R^2$ represents an alkyl group having 2 to 5 carbon atoms, a group represented by $-C(=O)-O-R^{2a}$, or a group represented by $-C(=O)-NH-R^{2a}$ (wherein the $R^{2a}$ represents an alkyl group having 1 to 8 carbon atoms), and the $R^1$ and the $R^2$ are optionally bonded to each other to form a cyclic structure.

In the method for producing the coated pigment of the embodiment, as examples of the metal particles (A), copolymer (B), monomer (B1), monomer (B2), polymerization initiator (C), and formula (1), there can be mentioned those described as examples in the <<Resin coated inorganic or metallic pigment>> above, and the detailed descriptions of them are omitted.

The step (i) may be a step in which the particles (A) and the monomer (B1) are subjected to reaction to form bonding to the particles (A). Examples of types of bonding include chemical bonding, such as covalent bonding, coordinate bonding, and ionic bonding.

The step (i) may be a step in which bonding is formed between the atoms on the uppermost surface of the particles (A) and the monomer (B1). Examples of types of bonding include chemical bonding, such as covalent bonding, coordinate bonding, and ionic bonding.

In the step (i), a state is formed in which the monomer (B1) or a structure derived from the monomer (B1), which is caused as a result of the reaction, is bonded to the surface of the particles (A). The monomer (B1) or the structure derived from the monomer (B1), which is bonded to the surface of the particles (A), can be a starting point of the subsequent radical polymerization.

In the step (ii), an acrylic copolymer (B) can be formed on the surface of the particles (A).

In the coated pigment produced through the step (i) and step (ii), the acrylic copolymer (B) can have a structural unit derived from the monomer (B1) and a structural unit derived from the monomer (B2) in this order from the particles (A) side.

In the step (i) and step (ii), the reaction can be allowed to proceed in the reaction solution. The reaction solution in the step (i) can contain the particles (A), the monomer (B1), a solvent and/or a dispersing medium and, if necessary, other components. The reaction solution in the step (ii) can contain a reaction product of the particles (A) and the monomer (B1), the polymerization initiator (C), the monomer (B2), a solvent and/or a dispersing medium and, if necessary, other components.

Examples of solvents and/or dispersing media include organic solvents. Examples of organic solvents include ester solvents, such as ethyl acetate, propyl acetate, and butyl acetate; ketone solvents, such as methyl ethyl ketone, methyl butyl ketone, and cyclohexanone; ether ester solvents, such as methyl cellosolve acetate and butyl cellosolve acetate; aromatic hydrocarbon solvents, such as toluene and xylene; amide solvents, such as dimethylformamide and dimethylacetamide; and petroleum solvents, such as mineral spirit. Examples of other components include a chain transfer agent for the radical polymerization reaction.

As an example of the temperature of the reaction solution in the step (i), there can be mentioned about 80 to 120° C.

The temperature of the reaction solution in the step (ii) is a reaction temperature of the radical polymerization reaction, and, for example, is preferably 80 to 110° C., more preferably 85 to 105° C., further preferably 90 to 100° C.

The radical polymerization reaction is preferably conducted under conditions such that the half-life time of the polymerization initiator (C) is 3 to 45 minutes, preferably conducted under conditions such that the half-life time of the initiator is 4 to 40 minutes, more preferably conducted under conditions such that the half-life time of the initiator is 5 to 35 minutes, further preferably conducted under conditions such that the half-life time of the initiator is 5 to 20 minutes, especially preferably conducted under conditions such that the half-life time of the initiator is 5 to 10 minutes.

The radical polymerization reaction may be conducted under conditions such that the half-life time of the initiator is 5 to 15 minutes, may be conducted under conditions such that the half-life time of the initiator is 15 to 25 minutes, and may be conducted under conditions such that the half-life time of the initiator is 25 to 35 minutes.

In the method for producing the coated pigment of the embodiment, by performing the step (i) and step (ii), the coated pigment of the embodiment is produced.

When the monomer (B1) and the monomer (B2) are subjected to radical polymerization reaction using the polymerization initiator (C) in the embodiment, the coating resin containing the resultant acrylic copolymer (B) is smooth and has a uniform thickness, so that the obtained coated pigment has excellent brightness and excellent chemical resistance.

EXAMPLES

Hereinbelow, the present invention will be described in more detail with reference to the following Examples, which should not be construed as limiting the scope of the invention. The "part(s)" and "%" are given by mass unless otherwise specified.

[Production of the Resin Coated Aluminum Pigment]

The coated pigment of the present invention was produced in accordance with the procedure described below.

Example 1

In a four-neck flask having a capacity of 3 L were placed 326 g of a raw material A (aluminum paste "MAXAL 64064", manufactured by Benda-Lutz Werke GmbH; average particle diameter: 15 μm; flattened shape; metal content: 67% by mass) and 1,080 g of mineral spirit (manufactured by JXTG Nippon Oil & Energy Corporation), and the temperature of the resultant mixture was increased to 100° C. in an inert gas atmosphere. Then, 2 g of acrylic acid as a raw material B1 was added and the resultant mixture was stirred at 100° C. for one hour. In this step, chemical bonding was formed between the surface of the aluminum particles as the raw material A and acrylic acid as the raw material B1. The formation of bonding was confirmed by FT-IR.

Then, 33 g of trimethylolpropane trimethacrylate as a raw material B2 and an initiator solution (which had been prepared by dissolving 0.5 g of 2,2'-azobis(2-methylbutyronitrile) as a raw material C in mineral spirit so as to be a 2.5 weight percent solution) were added, and the resultant mixture was subjected to polymerization at 100° C. for 4 hours. The half-life time of the initiator in the present Example was 6 minutes. After completion of the polymerization, the resultant reaction mixture was cooled to room temperature, and the reaction mixture was subjected to filtration, and washed using mineral spirit to obtain a resin coated aluminum pigment which is a bright material in a paste form. In the obtained particles, the weight ratio of the metal material and the resin coating layer was 86:14.

Examples 2 to 15

Syntheses were individually performed in substantially the same manner as in Example 1 except that the raw materials A to C and mineral spirit were changed to the compounds charged in the amounts (g) shown in Table 1 to obtain resin coated aluminum pigments in Examples 2 to 15 which are a bright material in a paste form. The polymerization reaction temperatures and the half-life times of the initiators in the Examples are shown in Table 1.

Comparative Examples 1 and 2

Syntheses were individually performed in substantially the same manner as in Example 1 except that the raw materials A to C and mineral spirit were changed to the compounds charged in the amounts (g) shown in Table 1 to obtain resin coated aluminum pigments in Comparative Examples 1 and 2 which are a bright material in a paste form. The polymerization reaction temperatures and the half-life times of the initiators in the Comparative Examples are shown in Table 1.

With respect to the obtained resin coated aluminum pigments, evaluation was conducted by the method described below.

[Evaluation of Chemical Resistance]

4.4 Parts by mass of a resin coated aluminum pigment (in terms of a nonvolatile content), 12.3 parts by mass of a varnish {BECKOLITE (registered trademark) M-6003-60, manufactured by DIC Corporation}, 1.8 parts by mass of SUPER BECKAMINE (registered trademark) L-105-60 (manufactured by DIC Corporation), 1.8 parts by mass of SUPER BECKAMINE (registered trademark) J-820-60 (manufactured by DIC Corporation), and 9.6 parts by mass of the total of mineral spirit and a mixed solvent {Solvesso (registered trademark) 100 (manufactured by Exxon Mobil Corporation):n-butanol=1:2} were mixed with one another and applied to a plastic plate. The resultant coated plate was dried at room temperature for 30 minutes, and then the coated plate was heated at 140° C. for 15 minutes to cure the coating film.

Three droplets of a 10% (w/v) aqueous solution of sodium hydroxide were placed on the above-obtained coated plate using a dropping pipette and stored at room temperature for 15 hours. Then, the coated plate was washed with water and dried, and visually evaluated as to whether the coating film on the plate had a color difference between before and after placing the droplets of aqueous sodium hydroxide solution, determining a chemical resistance. Relative evaluation of the chemical resistance was made in accordance with the following criteria: "○": No color difference was observed between before and after placing the droplets of aqueous sodium hydroxide solution, or slight dissolution was seen; and "×": Aluminum present at the potion on which the droplets of aqueous sodium hydroxide solution were placed was completely dissolved. The results are shown in Table 1.

TABLE 1

|  |  | Exp. 1 | Exp. 2 | Exp. 3 | Exp. 4 | Exp. 5 | Exp. 6 | Exp. 7 | Exp. 8 | Exp. 9 |
|---|---|---|---|---|---|---|---|---|---|---|
| Raw material A | MAXAL 64064 (Average particle diameter: 15 μm) | 326 | 326 | 326 | 326 | 326 | 326 | 326 | 326 | 326 |
|  | MAXAL 64054 (Average particle diameter: 17 μm) |  |  |  |  |  |  |  |  |  |
|  | MAXAL 64047 (Average particle diameter: 21.5 μm) |  |  |  |  |  |  |  |  |  |
|  | MAXAL 64065 (Average particle diameter: 14 μm) |  |  |  |  |  |  |  |  |  |
|  | MAXAL 64046 (Average particle diameter: 9 μm) |  |  |  |  |  |  |  |  |  |

TABLE 1-continued

| | | Exp. 1 | Exp. 2 | Exp. 3 | Exp. 4 | Exp. 5 | Exp. 6 | Exp. 7 | Exp. 8 | Exp. 9 |
|---|---|---|---|---|---|---|---|---|---|---|
| Organic solvent | Mineral spirit | 1,080 | 1,080 | 1,080 | 1,080 | 1,080 | 1,080 | 1,080 | | |
| | Normal-propyl acetate | | | | | | | | 1,080 | 1,080 |
| Raw material B1 | Acrylic acid | 2 | 2 | 2 | 1 | 5 | | | 2 | 2 |
| | Methacrylic acid | | | | | | 2 | | | |
| | 2-Methacryloyloxyethyl phosphate | | | | | | | 5 | | |
| Raw material B2 | Trimethylolpropane triacrylate | | | | | | | | | |
| | Trimethylolpropane trimethacrylate | 33 | 33 | 33 | 33 | 33 | 33 | 33 | | |
| | Pentaerythritol triacrylate | | | | | | | | 19.5 | |
| | Pentaerythritol tetraacrylate | | | | | | | | 13.5 | |
| | Dipentaerythritol pentaacrylate | | | | | | | | | 11.6 |
| | Dipentaerythritol hexaacrylate | | | | | | | | | 21.4 |
| Raw material C | 2,2'-Azobis(2-methylbutyronitrile) | 0.5 | 2.2 | 3.9 | 0.5 | 0.5 | 0.5 | 0.5 | 0.5 | 0.5 |
| | 2,2'-Azobis-2,4-dimethylvaleronitrile | | | | | | | | | |
| | Azobisisobutyronitrile | | | | | | | | | |
| Radical polymerization reaction temperature [° C.] | | 100 | 95 | 100 | 100 | 95 | 100 | 100 | 90 | 90 |
| Half-life time [min] | | 6 | 18 | 6 | 6 | 18 | 6 | 6 | 35 | 35 |
| Coating film evaluation | Resistance to alkali (10% NaOH spot test, after 15 hours) | ○ | ○ | ○ | ○ | ○ | ○ | ○ | ○ | ○ |

| | | Exp. 10 | Exp. 11 | Exp. 12 | Exp. 13 | Exp. 14 | Exp. 15 | Comp. Exp. 1 | Comp. Exp. 2 |
|---|---|---|---|---|---|---|---|---|---|
| Raw material A | MAXAL 64064 (Average particle diameter: 15 μm) | 326 | 326 | | | | | 326 | 326 |
| | MAXAL 64054 (Average particle diameter: 17 μm) | | | 326 | | | | | |
| | MAXAL 64047 (Average particle diameter: 21.5 μm) | | | | 326 | | | | |
| | MAXAL 64065 (Average particle diameter: 14 μm) | | | | | 326 | | | |
| | MAXAL 64046 (Average particle diameter: 9 μm) | | | | | | 326 | | |
| Organic solvent | Mineral spirit | | | 1,080 | 1,080 | 1,080 | 1,080 | | |
| | Normal-propyl acetate | 1,080 | 1,080 | | | | | 1,080 | 1,080 |
| Raw material B1 | Acrylic acid | 2 | 2 | 2 | 2 | 2 | 2 | 2 | 2 |
| | Methacrylic acid | | | | | | | | |
| | 2-Methacryloyloxyethyl phosphate | | | | | | | | |
| Raw material B2 | Trimethylolpropane triacrylate | 33 | 16.5 | | | | | | |
| | Trimethylolpropane trimethacrylate | | 16.5 | 33 | 33 | 33 | 33 | 33 | 33 |
| | Pentaerythritol triacrylate | | | | | | | | |
| | Pentaerythritol tetraacrylate | | | | | | | | |
| | Dipentaerythritol pentaacrylate | | | | | | | | |
| | Dipentaerythritol hexaacrylate | | | | | | | | |
| Raw material C | 2,2'-Azobis(2-methylbutyronitrile) | 0.5 | 0.5 | 0.5 | 0.5 | 0.5 | 0.5 | | |
| | 2,2'-Azobis-2,4-dimethylvaleronitrile | | | | | | | | 0.5 |
| | Azobisisobutyronitrile | | | | | | | 0.2 | |
| Radical polymerization reaction temperature [° C.] | | 90 | 90 | 100 | 100 | 100 | 100 | 80 | 70 |
| Half-life time [min] | | 35 | 35 | 6 | 6 | 6 | 6 | 75 | 49 |
| Coating film evaluation | Resistance to alkali (10% NaOH spot test, after 15 hours) | ○ | ○ | ○ | ○ | ○ | ○ | X | X |

The results in Table 1 have shown that, as compared to the resin coated aluminum pigments in Comparative Examples 1 and 2, which were produced using 2,2'-azobis-2,4-dimethylvaleronitrile or azobisisobutyronitrile as a polymerization initiator, the resin coated aluminum pigments in Examples 1 to 15, which were produced using 2,2'-azobis(2-methylbutyronitrile) as a polymerization initiator, have excellent resistance to alkalis with respect to the coating film containing the pigment. The reason for this is presumed that 2,2'-azobis(2-methylbutyronitrile) has a short half-life time, and therefore the surface of the aluminum particles was coated with a resin which is smooth and which has a uniform thickness.

The constructions in the embodiments and combinations thereof and the like are examples, and the addition, omission, replacement, and other changes of the constructions can be made as long as the effects aimed at by the present invention can be obtained. Further, the present invention is not limited by the embodiments, and is limited only by the scope of the claims.

INDUSTRIAL APPLICABILITY

In the present invention, there can be provided a pigment having excellent brightness and excellent resistance to chemicals, such as an alkali.

The invention claimed is:
1. A resin coated inorganic or metallic pigment comprising:
   inorganic or metallic particles (A); and
   an acrylic copolymer (B) formed on the inorganic or metallic particles (A) by subjecting a radically polymerizable unsaturated carboxylic acid or radically polymerizable phosphate monomer (B1) and a monomer (B2) containing 3 to 6 (meth)acryloyloxy groups per molecule to radical polymerization reaction using a polymerization initiator (C) containing a nitrile group, wherein
   an average particle diameter of the inorganic or metallic particles (A) is 0.1 to 100 μm,
   the inorganic or metallic particles (A) are coated with a coating resin comprising the acrylic copolymer (B), and the acrylic copolymer (B) has at a tail thereof a structure which is derived from the polymerization initiator (C) and which is represented by the following general formula (1):

[Chem. 1]

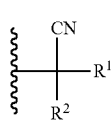

(1)

wherein $R^1$ represents a methyl group, and $R^2$ represents an alkyl group having 2 to 3 carbon atoms.

2. The resin coated inorganic or metallic pigment according to claim 1, wherein mass ratio of the inorganic or metallic particles (A) and the coating resin (the inorganic or metallic particles (A):coating resin) is 80:20 to 99.9:0.1.

* * * * *